F. BARTZ.
MEAT CUTTER.
APPLICATION FILED NOV. 17, 1908.

930,921. Patented Aug. 10, 1909.

Witnesses
R. J. Beall
Emory L. Goff

Inventor:
Frank Bartz,
By John D. Thomas & Co.
Attorneys

UNITED STATES PATENT OFFICE.

FRANK BARTZ, OF HORNELL, NEW YORK, ASSIGNOR TO THE A. J. DEER CO., OF HORNELL, NEW YORK, A CORPORATION OF NEW YORK.

MEAT-CUTTER.

No. 930,921. Specification of Letters Patent. Patented Aug. 10, 1909.

Application filed November 17, 1908. Serial No. 463,065.

*To all whom it may concern:*

Be it known that I, FRANK BARTZ, a citizen of the United States, residing at Hornell, in the county of Steuben and State of New York, have invented a Meat-Cutter, of which the following is a full and complete specification.

My invention is an improvement in meat-cutters, and relates more especially to that class which are driven by mechanical power, as an electric motor, and are supported by the gear-casing attached to the motor. In this class of meat cutting machines it is desirable that the meat cutting device be detachable from the motor so that it may be kept in a refrigerator or conveniently cleaned. This care is required inasmuch as particles of meat remain in the cutting device after each operation, and unless such particles are kept fresh by placing the meat-cutter in a refrigerator, or are entirely removed by cleaning the parts, they are likely to become spoiled and affect a batch of meat which may be subsequently operated upon.
In those instances where the machine is in frequent use it is customary to keep the meat cutter in a refrigerator when it is not in actual operation rather than take the time and trouble of cleaning it after each period of use, and as the whole machine should not be placed in the refrigerator, owing to the deleterious effect of the atmosphere on the motor, means must be provided to permit the meat cutting device of the machine to be detached. Unless such means provide for quickly and conveniently detaching the meat cutting device the tendency will be to move the entire machine, notwithstanding the danger to the motor.
The primary object of my invention, therefore, is to provide a motor-driven meat cutting machine in which the meat cutting device can be readily attached to and detached from the power mechanism, and when attached will be firmly and securely held in place.

My invention consists in providing the gear-casing of a meat cutting machine with an engaging surface which will coöperate with a corresponding surface on the inner end of the meat cutting device to form an intimate connection of the parts, in combination with means for clamping said parts together; all as hereinafter fully described and more specifically set forth in the appended claims.

Figure 1:
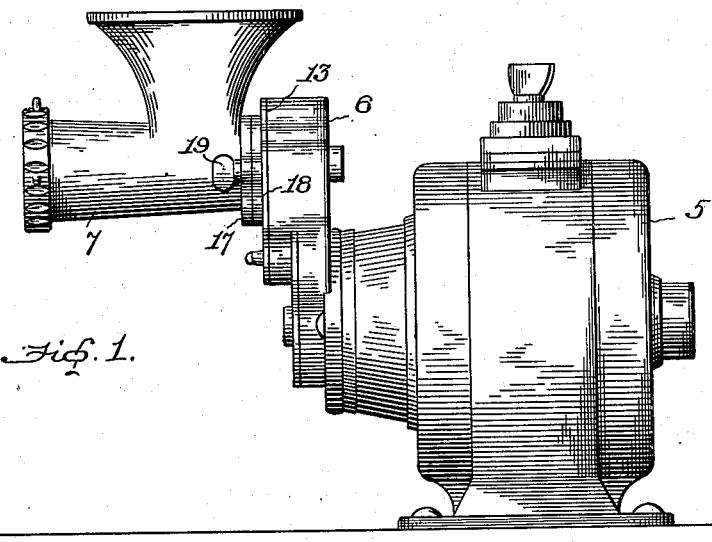
Figure 2:
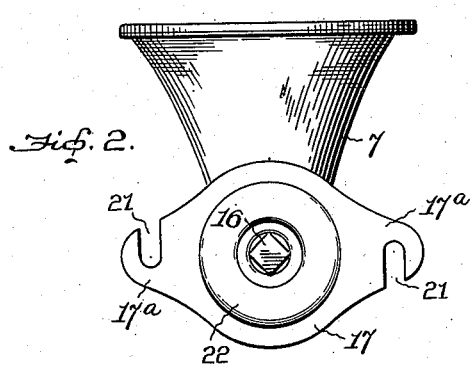
Figure 3:
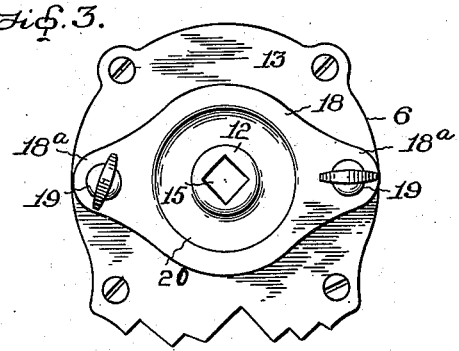
Figure 4:
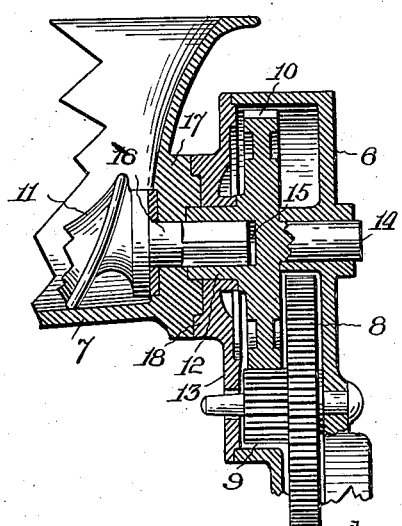

In the accompanying drawings, which form a part of this specification, and in which like numerals of reference indicate like parts in all the views: Figure 1 is a side elevation of a meat cutting machine embodying my invention. Fig. 2 is a rear end elevation of the meat cutting device, showing one of the engaging faces. Fig. 3 is a front elevation of the upper part of the gear-casing, showing the other engaging face. Fig. 4 is a sectional view through the gear-casing and meat cutting device.

Like numerals of reference indicate like parts in several figures of the drawings.

Referring to the drawings, 5 designates a motor, the inclosing case of which is adapted at one end for the attachment thereto of a casing 6, in which is mounted the reducing-gear and from which is supported the meat cutting device 7. In the present instance the reducing gear comprises a gear-wheel 8, driven directly from the motor and having at one side a pinion 9 in mesh with a gear-wheel, as 10, connected directly to the forcing-screw, as 11, of the meat cutting device. As herein shown the gear-wheel 10 is provided at one side with a hub 12, which turns in the front plate 13 of the gear-casing, and at the other side with a stub-shaft or gudgeon 14 which has a bearing in the back-plate of said gear-casing.

For the purpose of detachably connecting the forcing-screw 11 to the gearwheel 10 the hub 12 of the latter is provided with a square socket 15 adapted to receive the squared outer end of a gudgeon 16 projecting from the forcing-screw through and beyond the rear wall 17 of the casing or cylinder of the meat cutting device. The gudgeon 16 is provided at its inner end with a round portion for bearing within said rear wall 17.

For the purpose of supporting the meat cutting device 7 from the gear-casing 6 in such manner that it may be quickly and conveniently attached thereto and detached therefrom I provide the front plate 13 of the gear-casing with an enlargement or boss 18, which surrounds the bearing for the hub 12, and in which are threaded a pair of winged thumb-screws 19, disposed at opposite sides of said enlargement or boss. The enlargement or boss is annular in shape to provide a recess or socket 20, into which, at the center thereof, projects the hub 12 of the gearwheel 10, and has lateral extensions 18ª near the outer ends of which the thumb-screws are located. In order to coöperate with said boss the rear wall 17 of the meat cutting device is similarly shaped, and the extensions 17ª thereof, corresponding with the extension 18ª, are provided with open-ended slots 21 adapted to receive the thumb-screws, and centrally the end wall 17 is provided with an annular boss 22, which enters the socket 20 and surrounds the hub 12. By reference to Fig. 2 it will be seen that one of the slots 21 opens out at the upper edge of one extension of the end wall, and that the other slot opens out at the lower edge of the other extension, for a purpose hereinafter explained.

In connecting the parts the square ended gudgeon of the forcing-screw of the meat-cutting device is fitted in the hub 12 of the gearing, the annular boss 22 entering the socket 21 in the casing around said hub, and in this operation the extensions 17ª of the rear wall of the meat cutting device are so disposed that that slot opening out upwardly is below one of the thumb-screws, and the other slot, which opens out downwardly is above the other thumb-screw; so that when the meat cutting device is turned said slots will receive said thumb-screws, which latter may then be tightened to clamp the parts together. It will be understood that in connecting the parts the thumb-screws are not removed, but are simply loosened sufficiently to permit the extensions 17ª to enter behind the heads of said screws. In detaching the meat cutting device it is only necessary to loosen the thumb-screws and turn said device sufficiently to disengage it from the thumb-screws, when it may then be removed by withdrawing the gudgeon from the hub of the gearwheel. As will be readily seen, therefore, the operation of connecting the meat cutting device to the gear casing of the motor, as well as the operation of detaching it, may in each instance be readily and quickly performed; thus making it convenient to remove the meat cutting device for placing it in a refrigerator, or for other purposes.

The open ends of the slots 21 are disposed in the direction of the rotation of the forcing-screw so that in the operation of the machine the motion of said forcing-screw will tend to retain the extensions 17ª in engagement with the screws, so that the clamping action of said screws is not relied upon altogether.

Having thus described my invention, what I claim as new and desire to secure by Letters-Patent, is:—

1. In a meat cutting machine, the combination with a motor, gear-casing and meat-cutting device supported from the gear-casing, of binding-screws threaded in the gear-casing, and extensions on the meat cutting device having oppositely disposed open-ended slots adapted to receive the binding screw, substantially as shown and for the purpose set forth.

2. In a meat cutting machine, the combination with a motor, supporting-frame, and meat cutting device, of means for connecting the meat cutting device to the supporting-frame comprising binding-screws threaded into one of the parts to be connected, and extensions on the other part having open-ended slots adapted to receive the binding-screws, substantially as shown and for the purpose set forth.

3. In a meat cutting machine, the combination with a motor, supporting-frame, and meat cutting device having a rotatable forcing-screw, of means for connecting the meat cutting device detachably to the supporting frame and comprising binding-screws threaded into the supporting-frame, and extensions on the meat cutting device having open-ended slots which are adapted to receive the binding-screws, and slots opening out at opposite edges of the extensions and in the direction of rotation of the forcing-screw, substantially as shown and for the purpose set forth.

4. In a meat cutting machine, the combination with a motor, reducing-gears, and casing inclosing the latter, the reducing-gears having a gearwheel with a rectangular socket, of binding-screws threaded in the gear-casing at opposite sides of the socket, and a meat cutting device having a forcing-screw with a projecting gudgeon adapted to take into the rectangular socket, and extensions on the meat cutting device at opposite sides of the gudgeon, said extensions having open-ended slots which receive the binding-screws so that the latter may impinge on the extensions, substantially as shown and for the purpose set forth.

5. In a meat cutting machine, the combination with a motor, reducing-gears, and casing inclosing the latter, of a gear wheel forming a part of the reducing-gears and having a hub which projects beyond the front plate of the gear-casing and is provided with a rectangular socket, an annular boss on the front plate of the gear-casing forming an annular socket surrounding the hub, said boss having lateral extensions at opposite sides, and binding-screws threaded in the lateral projections of the boss; together with a meat cutting device having a forcing-screw and a rear wall with an annular boss adapted to take into the annular socket in the front plate of the gear-casing and lateral extensions with open-ended slots adapted to receive the binding-screws on said front plate, the forcing-screw being provided with a gudgeon which projects through the rear wall of the meat cutting device centrally with respect to the annular boss thereon and is provided with a rectangular end adapted to take into the socket in the gearwheel of the reducing-gears.

In testimony whereof I have signed my name to this specification in the presence of two subscribing witnesses.

FRANK BARTZ.

Witnesses:
 ELLIS H. WILLIAMS,
 L. G. HOLLANDS.